(12) United States Patent
Pan et al.

(10) Patent No.: US 10,547,437 B2
(45) Date of Patent: Jan. 28, 2020

(54) SYNCHRONIZATION SIGNAL TRANSMITTING DEVICE, METHOD THEREOF AND POWER ELECTRONIC APPARATUS HAVING THE DEVICE

(71) Applicant: DELTA ELECTRONICS (SHANGHAI) CO., LTD., Shanghai (CN)

(72) Inventors: Qielu Pan, Shanghai (CN); Wei Guan, Shanghai (CN); Hongyang Wu, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 582 days.

(21) Appl. No.: 14/624,022

(22) Filed: Feb. 17, 2015

(65) Prior Publication Data
US 2015/0236844 A1 Aug. 20, 2015

(30) Foreign Application Priority Data
Feb. 19, 2014 (CN) .......................... 2014 1 0056001

(51) Int. Cl.
*H04L 7/00* (2006.01)
*H04J 3/06* (2006.01)
(Continued)

(52) U.S. Cl.
CPC .............. *H04L 7/0008* (2013.01); *G06F 1/04* (2013.01); *G06F 1/12* (2013.01); *H04B 3/54* (2013.01);
(Continued)

(58) Field of Classification Search
None
See application file for complete search history.

(56) References Cited

U.S. PATENT DOCUMENTS

| 8,643,446 B2 * | 2/2014 | Subramanian ........... H04B 1/12 333/12 |
| 2006/0033558 A1 * | 2/2006 | Krasnansky ........ G06F 17/5063 327/544 |

(Continued)

FOREIGN PATENT DOCUMENTS

| CN | 1713480 | 12/2005 |
| CN | 201403046 | * 2/2010 ............ H02M 1/088 |

*Primary Examiner* — Tanh Q Nguyen
(74) *Attorney, Agent, or Firm* — Hauptman Ham, LLP (57) ABSTRACT

The present invention relates to a synchronization signal transmitting device, method thereof and a power electronic apparatus with the device. The synchronization signal transmitting device comprises at least one serial differential signal transmitter for receiving an identical-period pulse signal and outputting a differential signal pair, at least one serial differential signal receiver for receiving the differential signal pair and outputting a single-ended signal, and at least one controller for receiving the single-ended signal. Moreover, the controller is configured for conducting a signal filtering process and/or a signal reconstruction process to the single-ended signal, so as to obtain a synchronization signal. Thus, the present invention shows the advantages of transmission and process purely by hardware without participation of software, without occupation to calculating ability of processors, high time accuracy, and low time delay. The method and device can not only transmitting the identical synchronous clock signal with power frequency, but also the PWM carrier synchronous clock signal with high frequency ranged from several kHz to hundreds kHz.

5 Claims, 6 Drawing Sheets

(51) Int. Cl.
*G06F 1/04* (2006.01)
*G06F 1/12* (2006.01)
*H04L 25/49* (2006.01)
*H04B 3/54* (2006.01)

(52) U.S. Cl.
CPC ............. *H04J 3/06* (2013.01); *H04L 7/00* (2013.01); *H04L 25/4902* (2013.01)

(56) References Cited

U.S. PATENT DOCUMENTS

| | | | | | |
|---|---|---|---|---|---|
| 2009/0224810 | A1* | 9/2009 | Bergman | ............. | G06F 1/08 |
| | | | | | 327/162 |
| 2010/0124270 | A1* | 5/2010 | Yeh | ............. | H04N 7/108 |
| | | | | | 375/240.01 |
| 2011/0057881 | A1* | 3/2011 | Wen | ............. | G06F 3/023 |
| | | | | | 345/163 |
| 2014/0077872 | A1* | 3/2014 | Nagahisa | ............. | H03F 3/387 |
| | | | | | 330/2 |
| 2015/0236844 | A1* | 8/2015 | Pan | ............. | H04L 7/0008 |
| | | | | | 370/503 |
| 2015/0349853 | A1* | 12/2015 | Bosenko | ............. | H04B 5/02 |
| | | | | | 455/41.2 |

* cited by examiner

SYNCHRONIZATION SIGNAL TRANSMITTING DEVICE, METHOD THEREOF AND POWER ELECTRONIC APPARATUS HAVING THE DEVICE

BACKGROUND OF THE INVENTION

1. Field of the Invention

The present invention relates to the technology field of power electronic apparatuses, and more particularly to a synchronization signal transmitting device, a synchronization signal transmitting method and a power electronic apparatuses having the device.

2. Description of the Prior Art

In controlling a power electronic system, an identical synchronization clock signal with power frequency (called "power-frequency clock information" hereinafter) and/or a PWM carrier synchronization clock information (called "PWM carrier clock information" hereinafter) are provided to multi paralleled power electronic apparatuses so as to coordinate these apparatuses and enhance the electric power quality outputted by these apparatuses. Moreover, in the conventional power electronic system, an active detection method is commonly used for islanding detection in each of the power electronic apparatuses. To ensure the disturbance is added into each of the power electronic apparatuses coordinately, the disturbance information must be provided to each of them synchronously.

However, for a broad range-distributed power system, there are often long-distance (several hundred meters far at most) and strong electro-magnetic interference (EMI) among each other of different power electronic apparatuses, which lead to difficulty in reliably transmitting synchronization signal among multiple power electronic apparatuses. Accordingly, how to effectively transmit the synchronization signal under a harsh electromagnetic environment in a long-distance becomes an urgent issue to be resolved.

According to a conventional synchronization signal transmitting method for high power electronic apparatuses, a data frame from the information transmitter is transmitted to multiple paralleled processors at the receiver through CAN (Controller Area Network) buses or RS-485 buses. The data frame is a protocol data unit (PDU) of a data link layer (DLL) comprising frame header, data portion and frame end, wherein the frame header and the frame end includes essential control information, such as frame start information, addressing information and error control information, and the data portion includes the data to be transmitted such as synchronization information data.

After receiving the data frame, the processor at the receiver decodes, checks the data frame and makes time delay compensation to it, and thereby extract the synchronization signal from the data frame. If a data transmission error occurs due to EMI on CAN bus or on RS-485 bus, the processor can figure out the erroneous code by software verification and correct its effect on the synchronization signal. A reliable synchronization signal transmission is realized in this way.

However, the aforesaid method has the following shortcomings in spite of its enabling reliable synchronization signal transmitting by transmitting data frame on CAN bus or RS-485 bus:

(1) The aforesaid method may be used for transmitting the low frequency clock information such as power frequency of 50 Hz or 60 Hz, but cannot be used for transmitting high frequency PWM carrier clock information. The reason is that the Baud Rate used in the aforesaid method must be dozens times as high as the frequency of the transmitted synchronization clock information. Therefore, the necessary Baud Rate would be extremely high if the aforesaid method is used for transmitting the PWM carrier clock information (from several kHz to hundreds of kHz). For instance, when the PWM carrier has a frequency of 100 kHz, the necessary Baud Rate to transmit the data frame must be at least 5 Mbps. However, the CAN bus and/or the RS-485 bus are unable to accomplish such information transmission especially under a harsh electromagnetic environment in a long distance.

(2) The information transmission has very low time accuracy in the aforesaid method. In addition to receiving the synchronous clock signal, the processor at the receiver has many other programs to execute, for example, the high-priority interrupt program, the execution of which may affect the operation time of decoding and checking of the data frame. This would reduce the time accuracy of the transmitted synchronization clock information.

(3) The aforesaid method has a complicated adjustment of time delay compensation. From the aforesaid point (2), it may be known that a time delay of several milliseconds to hundreds of milliseconds may be caused due to execution of other programs. For this reason, the processor must make time delay compensation to the synchronization information. However, the execution time of software varies with the change of program code, which is not a constant, and this increases the difficulty and complicity in making time delay compensation to the synchronization signal.

(4) The aforesaid method has a high occupation to operating ability of the processors. From aforesaid points (2) and (3), in the aforesaid method the decoding, checking and time delay compensation of the data frame is mainly done by software, and thereby extracting the synchronization signal. However, with the frequency of the synchronization clock information increasing, the execution time of the used software become more inconstant, and hence a processor with higher operating ability is required, which leads to increased cost in processors.

Accordingly, in view of these shortcomings in conventional power electronic devices and method thereof, the inventor of the present application has made great efforts to make inventive research thereon and eventually provided a synchronization signal transmitting device, a synchronization signal transmitting method and a power electronic apparatus having the device.

SUMMARY OF THE INVENTION

The primary objective of the present invention is to provide a synchronization signal transmitting device and a method thereof, wherein the synchronization signal transmitting device and the method reveal the important technology features of simplicity in architecture and adjustment of time delay compensation. Moreover, the device and method also show the following advantages: transmission and process purely by hardware without participation of software, without occupation to calculating ability of processors, high time accuracy, and low time delay. The proposed synchronization signal transmitting device is able to assure the reliability of synchronization signal transmission in a long distance in a power electronic system under a harsh electromagnetic environment.

Accordingly, to achieve the primary objective of the present invention, the present invention provides a synchronization signal transmitting device, comprising:

at least one serial differential signal transmitter, used for receiving an identical-period pulse signal, and outputting the identical-period pulse signal by the form of a differential signal pair;

at least one serial differential signal receiver, coupled to the serial differential signal transmitter for receiving the differential signal pair, so as to transform the differential signal pair to a single-ended signal; and at least one controller, coupled to the at least one serial differential signal receiver for receiving the single-ended signal, wherein the controller conducts a signal filtering process and/or a signal reconstruction process to the single-ended signal to extract synchronization signal, and output a control signal for controlling the power output of a next-stage power converter according to the extracted synchronization signal.

Moreover, in order to achieve the primary objective of the present invention, the present invention further provides a synchronization signal transmitting method, comprising the steps of:

at least one serial differential signal transmitter receiving an identical-period pulse signal, and outputting the identical-period pulse signal by the form of a differential signal pair;

at least one serial differential signal receiver receiving the differential signal pair, so as to transform the differential signal pair to a single-ended signal; and at least one controller receiving the single-ended signal, wherein the controller conducts a signal filtering process and/or a signal reconstruction process to the single-ended signal to extract synchronization signal, and outputs a control signal for controlling the power output of a next-stage power converter according to the extracted synchronization signal.

Furthermore, the present invention also provides a power electronic apparatus having the aforesaid synchronization signal transmitting device, comprising:

a signal transceiver unit, used for outputting an identical-period pulse signal;

at least one serial differential signal transmitter, coupled to the signal transceiver unit for receiving the identical-period pulse signal, and outputting the identical-period pulse signal by the form of a differential signal pair;

at least one serial differential signal receiver, coupled to the serial differential signal transmitter for receiving the differential signal pair, so as to transform the differential signal pair to a single-ended signal; and at least one converter module, coupled to the at least one serial differential signal receiver, and comprising: a controller, coupled to the serial differential signal receiver for receiving the single-ended signal; and a power converter, coupled to the controller; wherein the controller conducts a signal filtering process and/or a signal reconstruction process to the received single-ended signal to extract synchronization signal, and outputs a control signal for controlling the power output of a next-stage power converter according to the extracted synchronization signal.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a synchronization signal transmitting device, a synchronization signal transmitting method and a power electronic apparatus having the synchronization signal transmitting device according to the present invention, embodiments of the present invention will be described in detail with reference to the attached drawings hereinafter.

Figure 1:
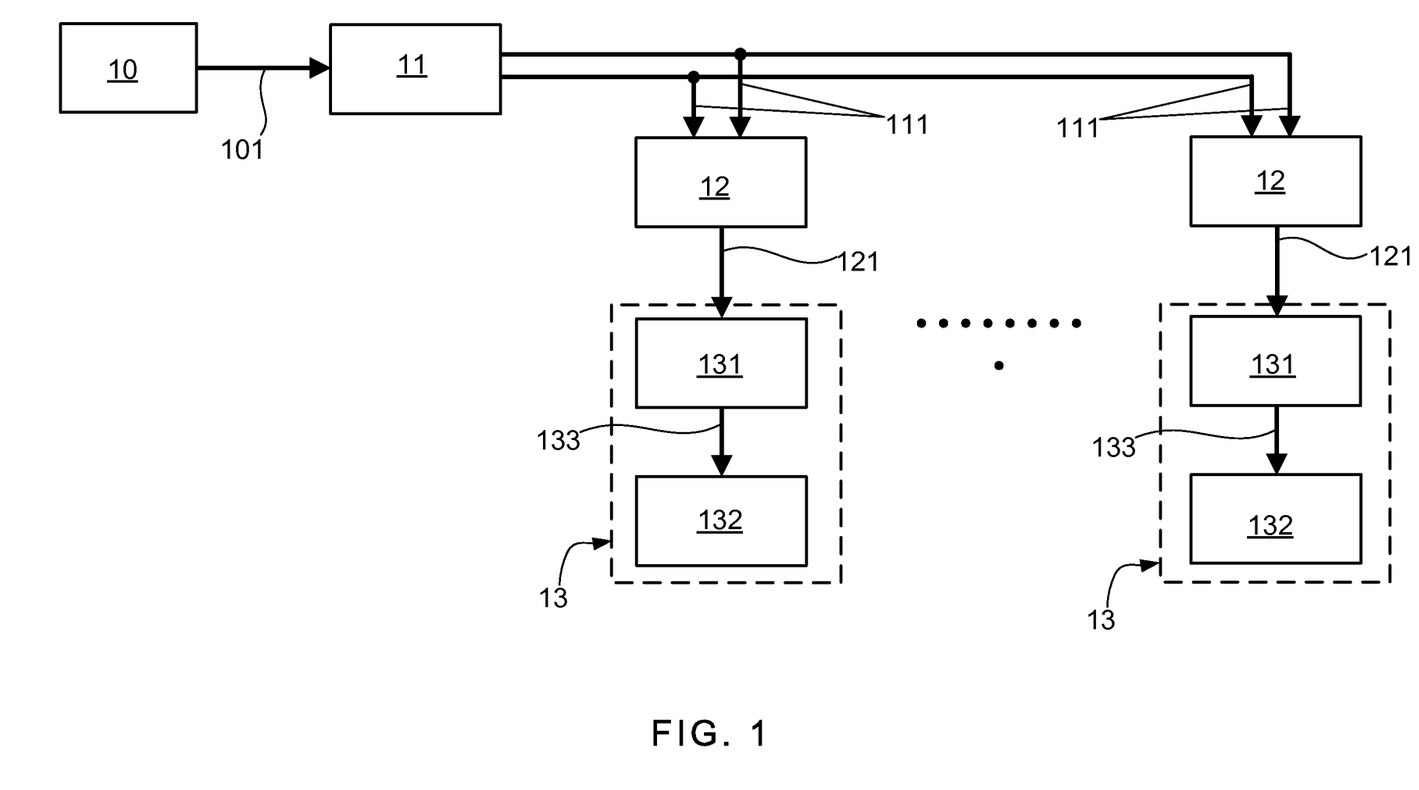
FIG. 1 shows an architecture diagram of a synchronization signal transmitting device according to the present invention.

With reference to FIG. 1, which illustrate an architecture diagram of a synchronization signal transmitting device according to the present invention. As shown in FIG. 1, the synchronization signal transmitting device of the present invention consists of: at least one serial differential signal transmitter 11, at least one serial differential signal receiver 12 and at least one controller 13 (FIG. 1 shows N serial differential signal receivers 12 and N controllers 13). In the present invention, the serial differential signal transmitter 11 is coupled to a synchronization signal transmitting unit 10 for receiving an identical-period pulse signal 101, so as to output the identical-period pulse signal 101 by the form of a differential signal pair 111. As shown by FIG. 1, the synchronization signal transmitting unit 10 can be a processor, a programmable logic device (PLD), or a combination of the processor and the programmable logic device. Moreover, although FIG. 1 shows that the identical-period pulse signal 101 is directly transmitted to the serial differential signal transmitter 11 by the synchronization signal transmitting unit 10, that does not use for limiting the transmission way of the identical-period pulse signal 101. In other applications, the synchronization signal transmitting unit 10 can also transmit the identical-period pulse signal 101 to the serial differential signal transmitter 11 through an optical coupler or a level converting circuit.

The identical-period pulse signal 101 means a voltage pulse signal such as a synchronous clock signal with power frequency and a PWM carrier synchronous clock signal, which are all capable of being measured by an oscilloscope. The synchronous clock signal with power frequency and the PWM carrier synchronous clock signal are transmitted by two different serial differential signal transmitters 11, respectively. Herein, it needs to further explain that, the "signal period" of the identical-period pulse signal means the time interval between the rising edges of two adjacent pulse or the falling edges of two adjacent pulses. In the description of the present invention hereafter, the "period" is defined to the time interval between the rising edges of two adjacent pulses. Moreover, the "identical period" means that any adjacent signal periods are equal (or almost the same to) on the time axis. Furthermore, the "almost the same" means the absolute value of the difference between any adjacent signal periods is smaller than 5% of the previous signal period thereof.

Figure 2:
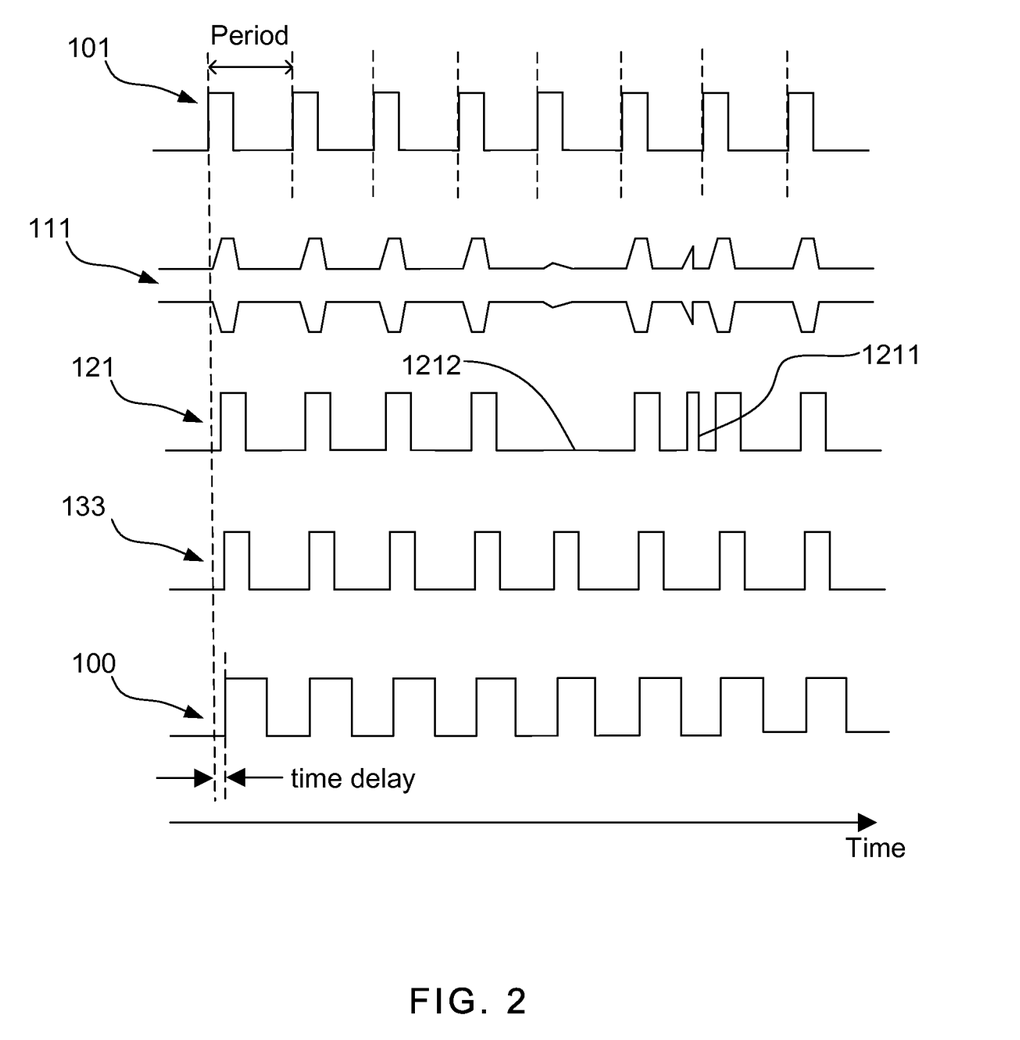
FIG. 2 shows oscillograms of a synchronization signal transmitted by the synchronization signal transmitting device of the present invention.

Continuously referring to FIG. 1, and please simultaneously refer to FIG. 2, which illustrate oscillograms during a synchronization signal transmitted by the synchronization signal transmitting device. As shown in FIG. 1 and FIG. 2, the serial differential signal receiver 12 is coupled to the serial differential signal transmitter 11 via a differential serial bus for receiving the differential signal pair 111 and transforming the differential signal pair 111 to a single-ended signal 121. The differential serial bus has a ground wire and a pair of differential signal wires. In this way, in one period, the differential serial bus just transmit one high level signal and one low level signal, while the conventional method needs to transmit a complete data frame generally including dozens of high level signal and low level signal. Therefore, it can obviously lower the requirement on Baud Rate and transmit the PWM carrier synchronous clock signal with high frequency by the differential serial bus.

In the present invention, both the serial differential signal transmitter 11 and the serial differential signal receiver 12 in FIG. 1 can be the CAN (Controller Area Network) transceiver, the RS-485 transceiver, the RS-422 transceiver, the MIL-STD-1553 (Military Standard) transceiver, the LVDS (Low-Voltage Differential Signaling) transceiver, the BLVDS (Bus Low-Voltage Differential Signaling) transceiver, or the MLVDS (Multipoint Low-Voltage Differential Signaling) transceiver.

Referring to FIG. 1 and FIG. 2, the controllers 13 of the synchronization signal transmitting device is coupled to the serial differential signal receiver 12 for receiving the single-ended signal 121. In other applications, the serial differential signal receiver 12 can also transmit the single-ended signal 121 to the controller 13 through an optical coupler or a level converting circuit. In the synchronization signal transmitting device of the present invention, the controller 13 consists of a programmable logic device 131 and a processor 132, wherein the programmable logic device 131 is used for receiving the single-ended signal 121. It is well known that, during signal transmission, the waveform distortion, glitch signal, and pulse missing would unavoidably occur in the differential signal pair 111 due to the interference of EMI. Although the single-ended signal 121 would be treated with level changing process and pulse shaping process, the single-ended signal 121 outputted by the serial differential signal receiver 12 still includes the glitch signal and pulse missing, for example glitch signal 1211 and pulse missing 1212 as shown in FIG. 2. The "glitch signal" means the additional pulse signal which should not occur in the time interval of the signal period of a transmitted pulse signal on the time axis. Generally, the time width of the glitch signal may smaller than the pulse width of the normal pulse signal, and may greater than or equal to the pulse width of the normal pulse signal. The programmable logic device 131 receives the single-ended signal as well as conducts a signal filtering process and/or a signal reconstruction process to the single-ended signal 121, so as to restore a normal identical-period pulse signal.

In the present invention, an arrival time interval of next pulse of the single-ended signal 121 can be calculated by the programmable logic device 131 according to an arrival time of the pulse front edge of current pulse of the single-ended signal 121 as well as a specific period of the single-ended signal 121. The aforesaid specific period is a measured value of the previous period of the single-ended signal 121, or a weighted average of the previous several periods of the single-ended signal 121. The arrival time interval of the next pulse accords with the following mathematical relationship: $t_{k+1} \in (t_k+0.95T, t_k+1.05T)$. In the mathematical relationship, T means the specific period, $t_{k+1}$ means the arrival time of the next pulse, and $t_k$ means the arrival time of the pulse front edge of the current pulse.

FIG. 2 shows the waveforms of the signal-ended signal 121. when executing the filtering process, the programmable logic devices 131 determine whether the next pulse of the single-ended signal 121 is received before the arrival time interval of the next pulse; if yes, the programmable logic devices 131 determines that the received pulse signal is an interference signal 1211 and filter it out. Moreover, when executing the signal reconstruction process, the programmable logic devices 131 would determine whether the next pulse of the single-ended signal 121 is received during the arrival time interval of the next pulse; if no, the programmable logic devices 131 determines that one pulse of the single-ended signal 121 has been lost and reconstruct a pulse of the single-ended signal 121. After the signal filtering process and/or the signal reconstruction process, a restored identical-period pulse signal 133 is obtained, which contains synchronization signal. As shown in FIG. 2, the restored identical-period pulse signal 133 includes a synchronous clock signal.

The processor 132 is coupled to the programmable logic device 131 for receiving the restored identical-period pulse signal 133. And according to the restored identical-period pulse signal 133, the processor 132 further outputs a control signal to synchronously control the power output of the next-stage power converter (FIG. 1 does not show the power converter). The identical-period pulse signal 133 outputted by the programmable logic devices 131 contains synchronization signal, the duty cycle of which is adjustable. For instance, as shown in FIG. 2, a clock signal 100 is outputted after the processors according to the specific period, which is synchronous with the restored identical-period pulse signal 133 and has a duty cycle approaching to 50% by fixing the rising edge and shifting the falling edge. Of course, duty cycle of the clock signal is not limit to 50%. The clock signal 100 can be synchronization signal with any necessary duty cycle according to the requirement of control. From FIG. 2, it can find that the restored identical-period pulse signal 133 and the clock signal 100 with a approximate 50% duty cycle show certain time delay compared to the identical-period pulse signal 101 at the transmitter. The time delay may be ranged from several nanoseconds to dozens of nanoseconds, depending on the hardware on the entire synchronization signal transmitting path. Obviously, when compared to the period (dozens of microseconds~dozens of milliseconds) of the identical-period pulse signal 101, the time delay occurring in the restored identical-period pulse signal 133 and/or the clock signal 100 is short enough to be ignored. For this reason, the controllers 13 don't need to execute the time delay compensation during the signal transmission.

In the present invention, the programmable logic device 131 can be the FPGA (Field Programmable Gate Array), the CPLD (Complex Programmable Logic Device), or the EPLD (Erasable Programmable Logic Device, EPLD). The processor can be the microcontroller, the digital signal processor, the central processor, the microprocessor, or the network processor.

Figure 3:
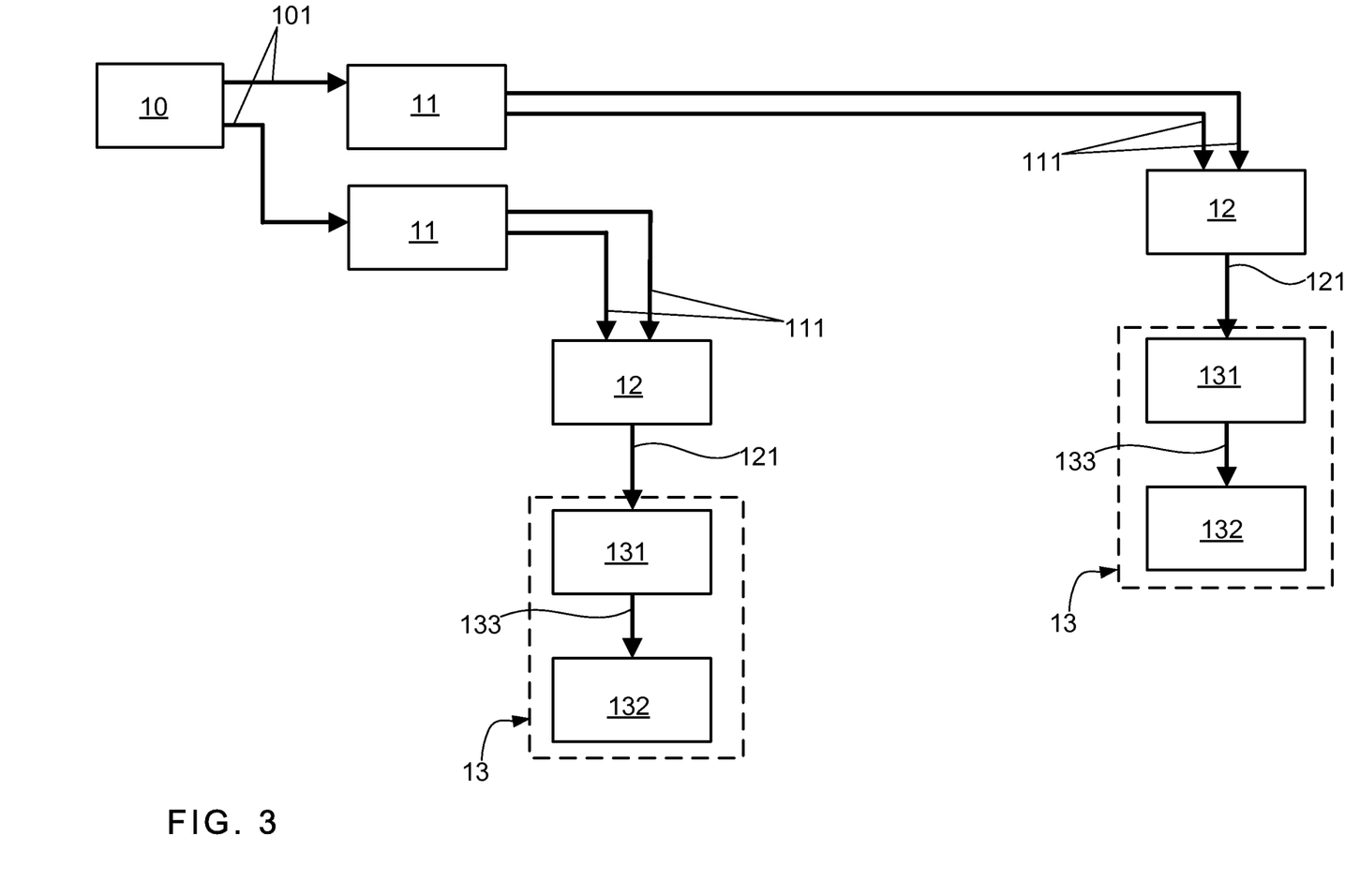
FIG. 3 shows a schematic diagram of a second architecture of the synchronization signal transmitting device according to the present invention.

FIG. 3 shows a schematic diagram of the second embodiment of the synchronization signal transmitting device according to the present invention. The synchronization signal transmitting device has two serial differential signal transmitters 11. The two serial differential signal transmitters respectively receive the identical-period pulse signal 101 outputted by the synchronization signal transmitting unit 10 and output the identical-period pulse signal 101 by the form of the differential signal pair 111. The identical-period pulse signal 101 can be a synchronous clock signal with power frequency or a PWM carrier synchronous clock signal, but not limited to this. In the second embodiment, the identical-period pulse signals 101 received by the two serial differential signal transmitters 11 can be both the synchronous clock signal with power frequency or both the PWM carrier synchronous clock signal. Besides, in other possible applications, the two serial differential signal transmitters 11 are able to respectively receive the synchronous clock signal with power frequency and the PWM carrier synchronous clock signal.

Figure 4:
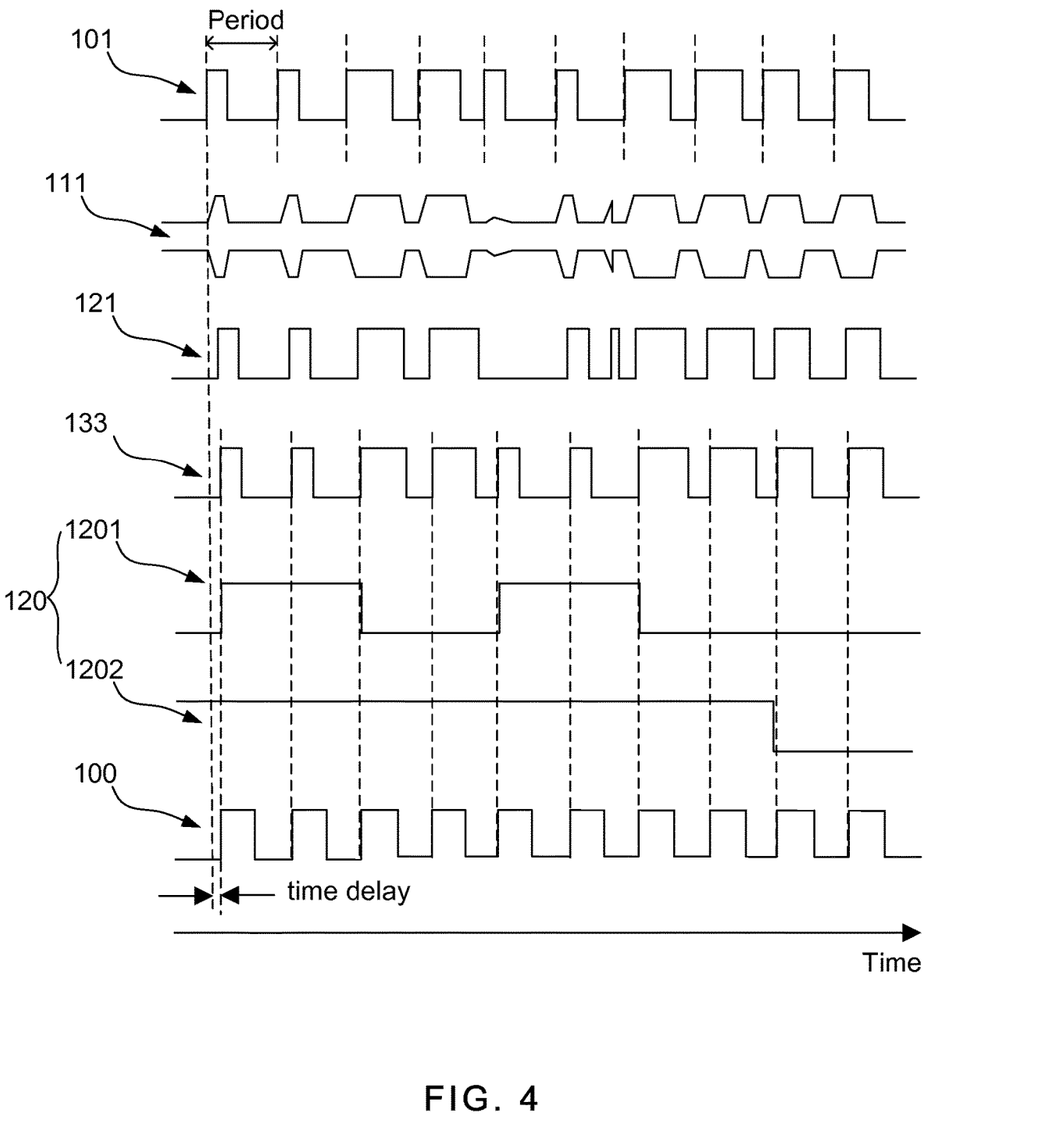
FIG. 4 shows oscillograms of the synchronization signal having a disturbance signal transmitted by the synchronization signal transmitting device of the present invention.

In spite of all periods of the identical-period pulse signal 101 shown in FIG. 4 are almost the same, duty cycles of each period of the identical-period pulse signal 101 are not constant. The another technology feature of the present invention is that the identical-period pulse signal 101 can transmit a disturbance signal by the duty cycle variations of each period of the identical-period pulse signal 101. FIG. 4 is a diagram showing waveforms of the synchronization signal with a disturbance signal transmitting. The duty cycles of each period of the identical-period pulse signal 101 are not constant and the identical-period pulse signal 101 simultaneously contains a synchronous clock signal and a disturbance signal by varying duty cycle.

As shown in FIG. 3 and FIG. 4, the identical-period pulse signal 101 with varying duty cycles is outputted by the form of a differential signal pair 111. And the differential signal pair 111 is further transformed to the signal-ended signal 121 by the serial differential signal receiver 12 coupled to the controller 13. The controller includes a programmable logic device 131 and a processor 132. The programmable logic device 131 receives the single-ended signal 121 and conducts the filtering process and/or the signal reconstruction process to the single-ended signal 121 to obtain a restored identical-period pulse signal 133. The restored identical-period pulse signal 133 includes the synchronization signal. The programmable logic device 131 further extracts the disturbance signal 120 by measuring the duty cycles of each period of the identical-period pulse signal 133. As shown in FIG. 4, the disturbance signal 120 consists of a disturbing direction signal 1201 and a disturbance-determining signal 1202, wherein the disturbance-determining signal 1202 is used for determining whether the disturbance signal is included in the identical-period pulse signal 133. Taking for example the restored identical-period pulse signal 133 shown in FIG. 4, if duty cycle of the pulse signal is ranged between 40% and 60%, there is no disturbance signal 120 being included in the restored identical-period pulse signal 133. In addition, if duty cycle of the pulse signal is smaller than 40%, it is determined that the restored identical-period pulse signal 133 carries a disturbance signal 120 and the disturbing direction signal 1201 of the disturbance signal 120 is a high-level signal, which means the disturbance signal 120 is positive disturbance signal. On the contrary, if duty cycle of the pulse signal is greater than 60%, it means that the identical-period pulse signal 133 also carries a disturbance signal 120, and, the carried disturbance signal 120 is negative disturbance signal and the disturbing direction signal 1201 of the disturbance signal 120 is a low-level signal. Herein, it needs to further explain that, although the duty cycle range (<40% or >60%) of the carried disturbance signal 120 has been introduced in aforesaid description, we can define a suitable duty cycle range of the disturbance signal 120, not limited to the range (<40% or >60%). Therefore, by controlling the duty cycle variation of the identical-period pulse signal 101, the synchronization signal transmitting device can not only transmit the disturbance signal but also other synchronization signals, such as an operation mode switching signal.

The restored identical-period pulse signal 133 containing the synchronization signal is outputted to the processor 132 by the programmable logic devices 131. The processor 132 outputs control signals to the next-stage power converter (FIG. 3 does not show the power converter) according to the synchronization signal, such as the clock signal 100 with the duty cycle approaching to 50% in FIG. 4. Similarly, in FIG. 4, it can find that the restored identical-period pulse signal 133 and the clock signal 100 show certain time delay compared to the identical-period pulse signal 101 at the transmitter. Obviously, when compared to the time interval of the period of the identical-period pulse signal 101, the time delay occurring in the restored identical-period pulse signal 133 and/or the clock signal 100 is short enough to be ignored. For this reason, the controller 13 does not need to execute the time delay compensation during the signal transmission.

Figure 5:
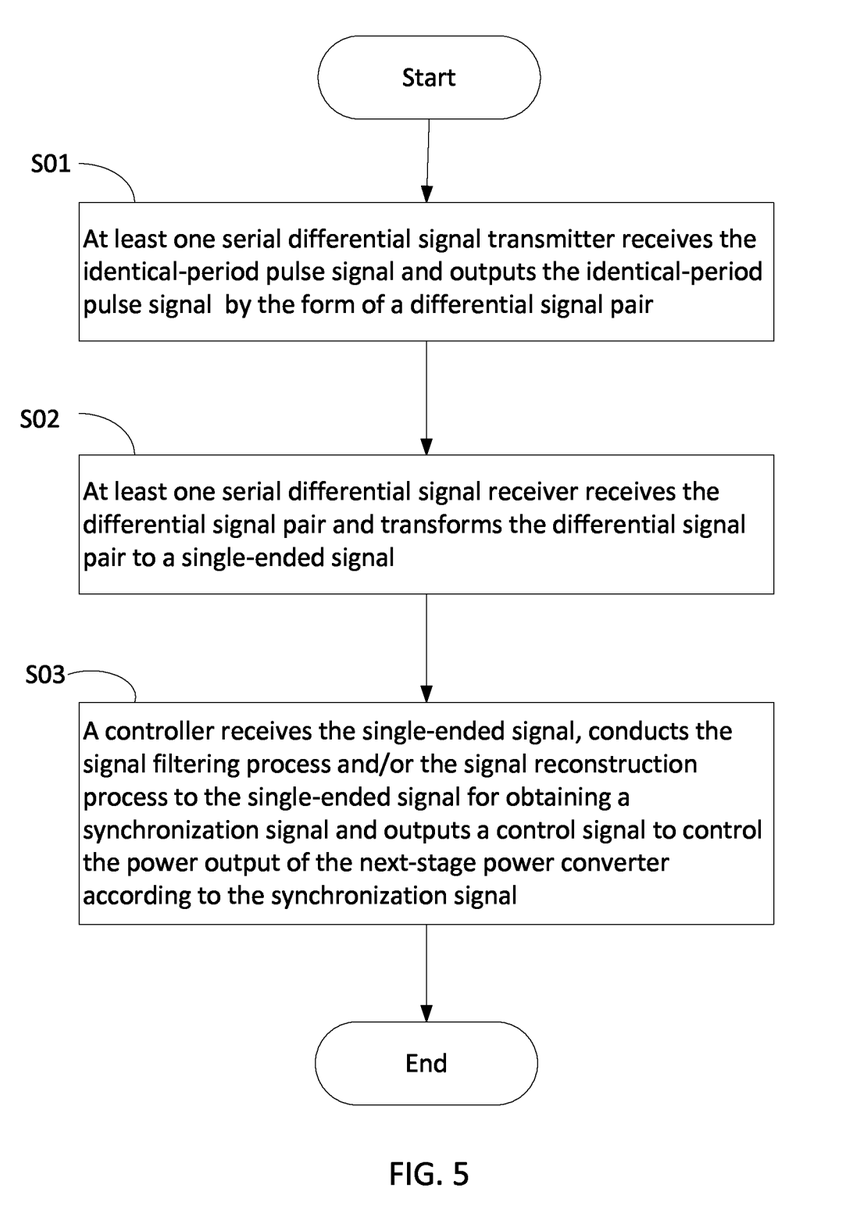
FIG. 5 shows a flow chart of a synchronization signal transmitting method according to the present invention.

After aforesaid descriptions, the topology of the synchronization signal transmitting device and the technology of signal transmission thereof have been introduced completely and clearly. A synchronization signal transmitting method will be introduced in following paragraphs. FIG. 5 shows a flow chart of the synchronization signal transmitting method according to the present invention. As shown in FIG. 5, the synchronization signal transmitting method mainly comprises 3 steps.

Before proceeding to step (S01), a synchronization signal transmitting unit 10 outputs an identical-period pulse signal 101 to the serial differential signal transmitter 11. The identical-period pulse signal 101 can be transmitted to the serial differential signal transmitter 11 directly by the synchronization signal transmitting unit 10, or through an optical coupler or a level converting circuit. Subsequently, execute the step (S01): the serial differential signal transmitter 11 receives the identical-period pulse signal 101 and outputs the identical-period pulse signal 101 by the form of a differential signal pair 111. Continuously, execute step (S02): the serial differential signal receiver 12 receives the differential signal pair 111 and transforms the differential signal pair 111 to a single-ended signal 121. Eventually, execute step (S03): the controller 13 receives the single-ended signal 121, conducts the signal filtering process and/or the signal reconstruction process to the single-ended signal 121 for obtaining a synchronization signal and outputs a control signal to control the power output of the next-stage power converter according to the synchronization signal.

As explained previously, the signal-filtering process mainly includes two steps. The first step is that the programmable logic device 131 calculates an arrival time interval of the next pulse of the single-ended signal 121 according to an arrival time of the pulse front edge of the current pulse as well as the period of the single-ended signal 121. The second step is that the programmable logic device 131 determines whether the next pulse of the single-ended signal 121 is received before the arrival time interval of the next pulse; if yes, the programmable logic device 131 determines that the received pulse of the single-ended signal 121 is an interference signal and filters it out. Moreover, the signal reconstruction process also mainly contains two steps. The first step is that the programmable logic device 131 calculates the arrival time interval of the next pulse of the single-ended signal 121 according to an arrival time of the pulse front edge of the current pulse as well as the period of the single-ended signal 121. The second step is that the programmable logic device 131 determines whether the next pulse of the single-ended signal 121 is received during the arrival time interval of the next pulse; if no, the programmable logic device 131 determines that one pulse of the single-ended signal 121 has been lost and reconstructs a pulse of the single-ended signal 121.

Figure 6:
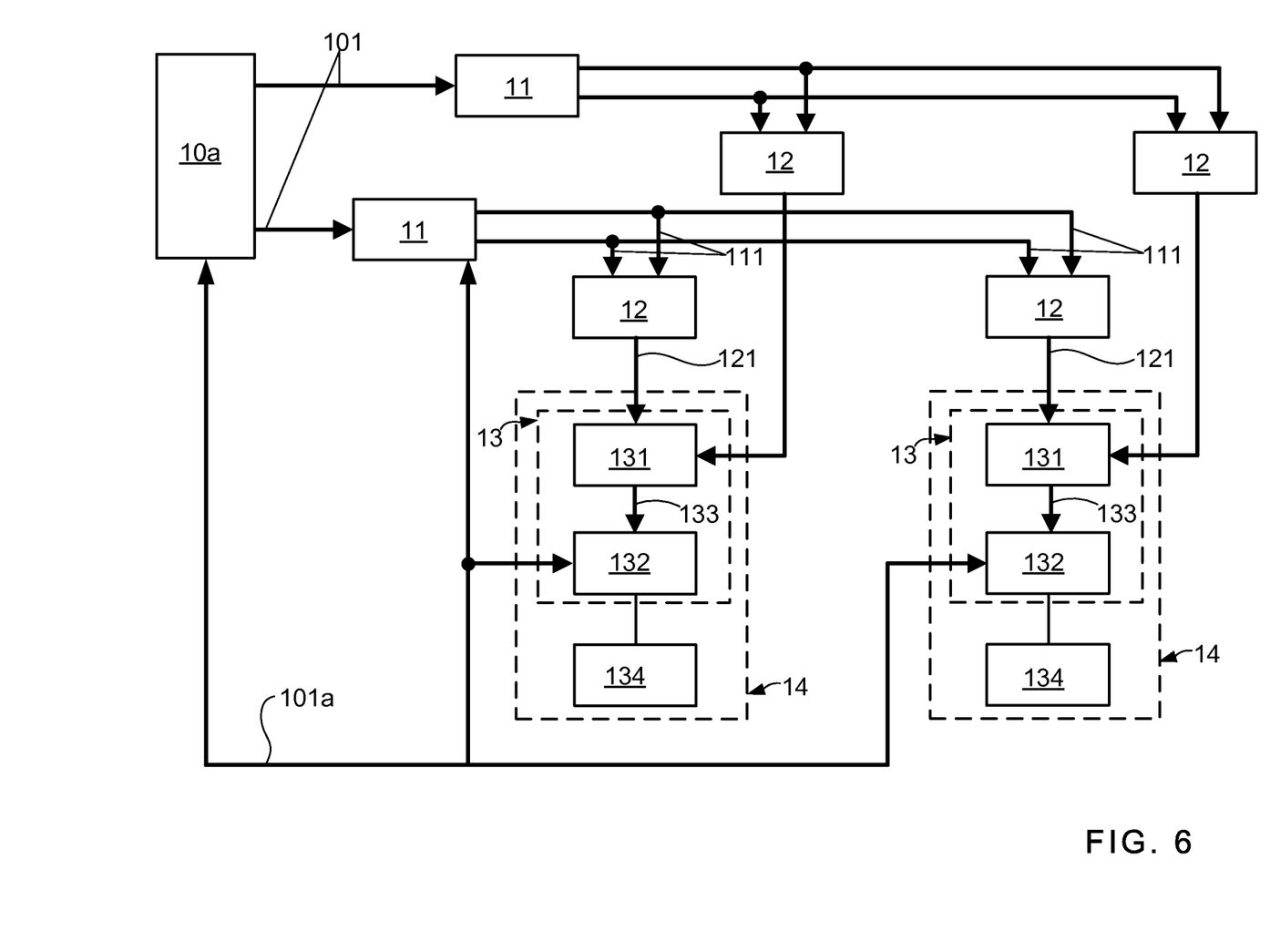
FIG. 6 shows an architecture diagram of a power electronic apparatus according to the present invention.

The above introduced synchronization signal transmitting device and the method thereof can be widely applied in a power electronic apparatus connected to an electric grid or a micro electric grid, and the said power electronic apparatus can be widely applied, such as the AVC (active voltage convertor), the SFC (shore frequency convertor), the UPS (uninterruptible power system), the SVG (static var generator), and the ESS (energy storage system). Please refer to FIG. 6, which illustrates a diagram of a power electronic apparatus according to the present invention. As shown in FIG. 6, the power electronic apparatus consists of: a signal transceiver unit 10a, at least one serial differential signal transmitter 11, at least one serial differential signal receiver 12, and at least one converter module 14. The signal transceiver unit 10a can be a processor, a programmable logic device (PLD), or the combination of the processor and the programmable logic device.

FIG. 6 shows two serial differential signal transmitters 11 for receiving identical-period pulse signals 101, respectively. In the power electronic apparatus, the identical-period pulse signals 101 received by the two serial differential signal transmitters 11 can both be the synchronous clock signal with power frequency or the PWM carrier synchronous clock signal. Besides, in other possible applications, the two serial differential signal transmitters 11 are able to respectively receive the synchronous clock signal with power frequency and the PWM carrier synchronous clock signal. Moreover, each the serial differential signal transmitter 11 is coupled to several serial differential signal receivers 12 via the differential serial bus, and transmits the identical-period pulse signal 101 to the serial differential signal receivers 12 by the form of the differential signal pair 111. The serial differential signal receiver 12 transforms the differential signal pair 111 to a single-ended signal 121 after receiving the differential signal pair 111. The serial differential signal receiver 12 is connected to the corresponding power converter module 14 and transmits the single-ended signal 121 to the corresponding power converter module 14. In other possible applications, the serial differential signal receiver 12 can also transmit the single-ended signal 121 to the power converter module 14 through an optical coupler or a level converting circuit. As shown in FIG. 6, the converter module 14 consists of a controller 13 and a power converter 134. The controller 13 includes a programmable logic device 131 and a processor 132. The programmable logic device 131 is used to receive the single-ended signal 121, and conducts the signal filtering process and/or the signal reconstruction process to the single-ended signal 121 to obtain a restored identical-period pulse signal 133 including synchronization signal (as shown in FIG. 4). The programmable logic device 131 calculates an arrival time interval of the next pulse of the single-ended signal 121 according to an arrival time of the pulse front edge of the current pulse as well as the period of the single-ended signal 121 for conducting the signal filtering process and/or the signal reconstruction process to restore the identical-period pulse signal 133 which comprises the synchronization signal (as shown in FIG. 4). Therefore, the processor 132 coupled to the programmable logic device 131 outputs control signals according to the restored synchronization signal to synchronously control the power output of the power converter 134.

FIG. 6 shows an architecture diagram of a power electronic apparatus according to the present invention. As shown in FIG. 6, the signal transceiver unit 10a and the processors 132 are connected by a communication bus 101a. The signal transceiver unit 10a sends a control command to the processors 132 by the communication bus 101a. According to the received control command, the processors 132 controls the corresponding power converter 134 to carry out the conversion of electrical energy. The control commands can be a power on/off command, a power output controlling command and so on. In addition, the processors 132 can also access state information of the corresponding power converters 134 and transmit the state information to the signal transceiver unit 10a through the communication bus 101a. The state information can be the voltage information, the current information or the power information of the power converters 134. Moreover, the signal transceiver unit 10a may directly transmit the identical-period pulse signal 101 to the serial differential signal transmitters 11, or transmit the identical-period pulse signal 101 to the serial differential signal transmitters 11 through an optical coupler or a level converting circuit. Herein, it needs to further explain that the serial differential signal transmitter 11 and the serial differential signal receiver 12 shown in FIG. 6 is the same to the serial differential signal transmitter 11 and the serial differential signal receiver 12 shown in FIG. 1, respectively.

The power electronic apparatus adopts active detection methods to complete the grid islanding detection. The active detection methods include frequency disturbance injection method, phase disturbance injection method, and reactive disturbance injection method. When using any one abovementioned method to execute the islanding detection for the parallel power converters 14 shown in FIG. 6, it must strictly control the disturbance signal to be synchronously injected into each of the power converters 14. Similarly, the disturbance signal can be injected by the way of controlling the duty cycle variations of each period of the identical-period pulse signal 101, and can be extracted from the identical-period pulse signal 133 by the way of measuring the duty cycles of each period of the identical-period pulse signal 133. Taking the frequency disturbance injection method for instance, the processor 132 would receive the synchronous disturbance signal from the programmable logic device 131, and inject the frequency disturbance signal into each of the corresponding power converters 134 coordinately, so as to make the operating frequency of the power converters 134 shift synchronously. At the meantime, the processors 132 would simultaneously detect the frequency of the output voltage of the power converters 134, and send the frequency of the output voltage back to the signal transceiver unit 10a. The received frequency of the output voltage is compared with the frequency of grid voltage in the transceiver unit 10a. If the frequency of the output voltage is beyond the normal variation range of the frequency of grid voltage, the power electronic apparatus is determined to be in an island state. Herein, it needs to further explain that the normal variation range means that the frequency of the output voltage must be smaller than the rated frequency of the grid voltage plus 0.5 Hz, or greater than the rated frequency of the grid voltage minus 0.7 Hz.

Thus, through above descriptions, the synchronization signal transmitting device, the synchronization signal transmitting method and the power electronic apparatus of the present invention have been completely and clearly introduced. In summary, the present invention includes the advantages of:

(1) The synchronization signal transmitting device and the method reveal the important technology features of simplicity in architecture and adjustment of delay time compensation. Moreover, the device and method also show the following advantages: transmission and process purely by hardware without participation of software, without occupation to calculating ability of processors, high time accuracy, and low time delay (several nanoseconds to dozens of nanoseconds, negligible).

(2) The synchronization signal transmitting device and the power electronic apparatus having the synchronization signal transmitting device can not only be used for transmitting the identical synchronous clock signal with power frequency, but also the PWM carrier synchronous clock signal with high frequency ranged from several kHz to hundreds kHz. Comparing to the conventional signal transmission technology, their requirement on Baud Rate is obviously reduced.

(3) Besides, the programmable logic devices can filter out the signal glitch and reconstruct the missing pulse in the identical-period pulse signal induced by EMI. The synchronization signal can be reliably transmitted by the synchronization signal transmitting device and the power electronic apparatus with the device.

(4) Furthermore, in the present invention, the grid island detection to the power electronic apparatuses can also be carried out by controlling the duty cycle variations of each period of the transmitted identical-period pulse signal.

The above description is made on embodiments of the present invention. However, the embodiments are not intended to limit scope of the present invention, and all equivalent implementations or alterations within the spirit of the present invention still fall within the scope of the present invention.

What is claimed is:

1. A synchronization signal transmitting method, comprising steps of:
    each of at least one serial differential signal transmitter receiving an identical-period pulse signal, and outputting the identical-period pulse signal by the form of a differential signal pair;
    each of at least one serial differential signal receiver coupled to a corresponding serial differential signal transmitter receiving the differential signal pair outputted by the corresponding serial differential signal transmitter, so as to transform the differential signal pair to a single-ended signal; and
    each of at least one controller coupled to a corresponding serial differential signal receiver receiving the single-ended signal from the corresponding serial differential signal receiver, calculating an arrival time interval of a next pulse of the received single-ended signal according to an arrival time of a pulse front edge of a current pulse of the received single-ended signal and according to a specific period of the received single-ended signal, wherein
        when an arrival time of the next pulse signal of the received single-ended signal is not within the calculated arrival time interval, each of the at least one controller conducts a corresponding signal filtering process and/or a corresponding signal reconstruction process to the received single-ended signal for obtaining a corresponding synchronization signal, and
    wherein
        the specific period of the received single-ended signal is equal to an average value of several previous periods of the received single-ended signal.

2. The synchronization signal transmitting method of claim 1, wherein the identical-period pulse signal is a synchronous clock signal with power frequency or a PWM carrier synchronous clock signal.

3. The synchronization signal transmitting method of claim 2, wherein the at least one serial differential signal transmitter comprises two serial differential signal transmitters, and the two serial differential signal transmitters receive the synchronous clock signal with power frequency and the PWM carrier synchronous clock signal, respectively.

4. The synchronization signal transmitting method of claim 1, wherein the corresponding signal filtering process comprises steps of:
    determining whether the next pulse of the received single-ended signal is received before the calculated arrival time interval of the next pulse; if yes, it is determined that the received pulse of the received single-ended signal is an interference pulse signal and filtering out the received pulse.

5. The synchronization signal transmitting method of claim 4, wherein the corresponding signal reconstruction process comprises steps of:
    determining whether the next pulse of the received single-ended signal is received during the calculated arrival time interval of the next pulse; if no, it is determined that one pulse of the received single-ended signal has been lost and reconstructing the lost pulse of the received single-ended signal.

* * * * *